(12) United States Patent
Carlson et al.

(10) Patent No.: US 8,757,091 B2
(45) Date of Patent: Jun. 24, 2014

(54) ARRANGEMENT AND METHOD FOR INDICATING UNDESIRED DETACHMENT OF A MILKING MEMBER FROM AN ANIMAL

(75) Inventors: Bjorn Carlson, Huddinge (SE); Daniel Heim, Platte City, MO (US); Mats Stellnert, Weatherby Lake, MO (US); Stuart Wipperfurth, Cambridge, WI (US)

(73) Assignee: DeLaval Holding AB, Tumba (SE)

( * ) Notice: Subject to any disclaimer, the term of this patent is extended or adjusted under 35 U.S.C. 154(b) by 173 days.

(21) Appl. No.: 13/393,848

(22) PCT Filed: Sep. 13, 2010

(86) PCT No.: PCT/EP2010/063355
§ 371 (c)(1),
(2), (4) Date: Mar. 2, 2012

(87) PCT Pub. No.: WO2011/032902
PCT Pub. Date: Mar. 24, 2011

(65) Prior Publication Data
US 2012/0160175 A1 Jun. 28, 2012

(30) Foreign Application Priority Data
Sep. 18, 2009 (SE) ........................................ 0901197

(51) Int. Cl.
*A01J 5/01* (2006.01)
(52) U.S. Cl.
USPC ..................... 119/14.02; 119/14.08; 119/14.1; 119/14.14; 119/14.15
(58) Field of Classification Search
USPC ............ 119/14.01, 14.02, 14.08, 14.1, 14.14, 119/14.15
See application file for complete search history.

(56) References Cited

U.S. PATENT DOCUMENTS

| | | | |
|---|---|---|---|
| 3,499,422 A | 3/1970 | Nelson | |
| 3,837,318 A | 9/1974 | Duncan et al. | |
| 4,228,763 A * | 10/1980 | Heidecker et al. | 119/14.08 |
| 4,263,874 A | 4/1981 | Flocchini | |
| 4,408,564 A | 10/1983 | Flocchini | |

(Continued)

FOREIGN PATENT DOCUMENTS

| | | | |
|---|---|---|---|
| EP | 0 774 203 A1 | 5/1997 | |
| GB | 2090431 A * | 7/1982 | G05B 19/02 |

(Continued)

OTHER PUBLICATIONS

International-Type Search Report, dated Feb. 19, 2010, from corresponding PCT application.

(Continued)

*Primary Examiner* — Rob Swiatek
*Assistant Examiner* — Lisa Tsang
(74) *Attorney, Agent, or Firm* — Young & Thompson

(57) ABSTRACT

An arrangement and a method for indicating an undesired detachment of a milking member from an animal in a milking stall. The arrangement includes a removing device adapted to detach the milking member from the animal and move the detached milking member to a parking position when the milking process has been completed, and a supervision device adapted to supervise when the milking member has been detached from the animal before the milking process has been completed. When the milking member has been detached from the animal before the milking process has been completed, the removing device is adapted to move the undesirably detached milking member to an indicating position located at a distance from the parking position.

21 Claims, 2 Drawing Sheets

(56) References Cited

U.S. PATENT DOCUMENTS

| | | | |
|---|---|---|---|
| 4,574,736 | A | 3/1986 | Tanaka et al. |
| 6,450,118 | B1 | 9/2002 | Eppers, Jr. |
| 6,814,027 | B2 * | 11/2004 | Hein et al. ................ 119/14.04 |
| 2008/0314322 | A1 | 12/2008 | Stellnert et al. |
| 2011/0214612 | A1 * | 9/2011 | Andersson ................ 119/14.04 |

FOREIGN PATENT DOCUMENTS

| | | |
|---|---|---|
| RU | 2 014 780 C1 | 6/1994 |
| RU | 2 203 535 C2 | 5/2003 |
| SU | 1526564 A3 | 11/1989 |
| WO | 01/93668 A1 | 12/2001 |
| WO | 02/15676 A1 | 2/2002 |

OTHER PUBLICATIONS

International Search Report, dated Jul. 6, 2011, from corresponding PCT application.

Supplementary International Search Report, dated Sep. 22, 2011, from corresponding PCT application.

\* cited by examiner

ARRANGEMENT AND METHOD FOR INDICATING UNDESIRED DETACHMENT OF A MILKING MEMBER FROM AN ANIMAL

BACKGROUND OF THE INVENTION AND PRIOR ART

The present invention relates to an arrangement and a method for indicating an undesired detachment of a milking member from an animal in a milking stall. The arrangement comprises a removing device adapted to detach the milking member from an animal in the milking stall when a milking process has been completed and move it to a parking position.

In many milking parlours, a removing device is used for detaching a milking member from a cow and moving it to a parking position in a milking stall. The removing device may be automatically activated when the milking flow during the main milk phase of the cow drops below a predetermined minimum value. However, there is always a risk that the milking member is kicked off by the cow or detached for other reasons during the milking process. Even in the case that the milking member is detached in an undesired manner before the milking process is completed, the milking flow drops below the predetermined lowest value. As a result, the removing device is activated and it moves the milking member to the parking position. Such an undesired detachment of the milking member is many times difficult to observe for an operator and it is especially difficult to observe in milking parlours comprising a large number of milking stalls. Such a premature detachment of the milking member results in the cow not being completely milked. Furthermore, it reduces the milking efficiency of the milking parlour.

SUMMARY OF THE INVENTION

The object of the present invention is to provide an arrangement and a method which, in a simple and effective manner, makes it possible to provide complete milking processes in a milking stall even if a milking member is detached from an animal during the milking process.

This object is achieved by the initially mentioned arrangement which is characterized by the features that it comprises a supervision device adapted to supervise if the milking member has been detached from the animal before the milking process has been completed, and if this is the case, that the removing device is adapted to move the undesirably detached milking member to an indicating position located at a distance from the parking position. There is always a risk that the milking member will be kicked off or be detached for another reason during a milking process. According to the invention, the milking member is moved to a position at a distance from the ordinary parking position in the case that the milking member has been detached in an undesired manner before the milking process has been completed. Preferably, the indicating position is located at a clear distance from the parking position and in an area in which the milking member is well visible for an operator working in the milking parlour. It is thereby possible for the operator to substantially immediately notice that a milking member has been unintentionally detached from an animal in a milking stall. The operator now has the possibility to relatively quickly reattach the milking member to the animal such that the milking process of the animal will be resumed. Thus, the arrangement makes it possible to provide complete milking processes in a milking stall even in the case that the milking member is detached from the animal during the milking process.

According to an embodiment of the invention, the removing device is adapted to move the milking member to an indicating position located at a vertical level which differs from the vertical level of the parking position. A milking member located in an indicating position at a lower vertical level or higher vertical level than the ordinary parking position is easy to notice for an operator.

According to an embodiment of the invention, the arrangement comprises a milk meter adapted to measure the milk flow during a milking process in the milking stall, and the removing device is adapted to detach the milking member from an animal when the milk flow drops below a predetermined minimum value. The milk flow varies with time during a milking process. During an end phase of the milking process, the milk flow decreases. When the milk flow drops below a suitable minimum value, this indicates that the animal has been completely milked and it is time to detach the milking member from the animal.

According to an embodiment of the invention, the supervision device comprises sensing means adapted to sense a parameter indicating if the milking member has been detached from the animal before a milking process has been completed, and a control unit adapted to determine if the milking member has been detached from the animal before a milking process has been completed in view of received parameter values from said sensing means. The sensing means may comprise one or several sensors sensing parameters indicating a premature detachment of the milking member. The control unit may be a computer or the like comprising software adapted to determine if the milking member has been detached before the milking process has been completed in view of received parameter values.

According to an embodiment of the invention, the sensing means comprises said milk meter, and the control unit is adapted to determine if the milking member has been detached from the animal before a milking process has been completed in view of received parameter values indicating that the milk flow has been abruptly ceased. During a complete milking process the milk flow decreases relatively continuously during the end phase of the milking process. If the milk flow is abruptly ceased from a milk flow level above the predetermined minimum value to a zero level, this indicates that the milking member has been detached from the animal before the milking process has been completed.

According to an embodiment of the invention, the control unit is adapted to determine if the milking member has been detached from the animal before a milking process has been completed in view of received parameter values indicating that the amount of milk produced during a milking process is lower than a predetermined minimum value. In the case that the produced amount of milk is considerably lower than an expected amount, this indicates that the milking member has been detached from the animal before the milking process has been completed.

According to an embodiment of the invention, the sensing means comprises a timer adapted to measure the time period of the milking process, and the control unit is adapted to determine if the milking member has been detached from the animal before a milking process has been completed in view of received parameter values indicating that the time period of the milking process is shorter than a predetermined minimum value. In the case that the time period of the milking process is much shorter than an expected time period, this indicates that the milking member has been detached from the animal before the milking process has been completed. The above mentioned predetermined minimum values may be the same for all animals milked in the milking stall. Alternatively, they may vary for individual animals.

According to an embodiment of the invention, the arrangement comprises a visible alarm and/or an audible alarm adapted to be activated when the milking member has been moved to the indicating position. Such an alarm provides an additional indication for an operator that a milking member has been detached before the milking process has been completed.

According to an embodiment of the invention, the removing device is adapted to move the milking member from the indicating position to the parking position when a predetermined time period has passed or a predetermined event has taken place. If the positioning of the milking member in the indicating position is not observed or ignored by an operator within a predetermined time period or before a predetermined event (such as e.g. the opening of a specific gate) takes place, the milking member will be moved to the ordinary parking position. Thereby, it is possible to fetch the milking member from the ordinary parking position when it is to be attached to a following animal in the milking stall.

According to an embodiment of the invention, the milking member is a cluster comprising a claw and several teat cups connected to the claw. In this case, the removing device is adapted to detach the cluster and all teat cups from the animal at the same time when a milking process has been completed. Alternatively, the milking member is a single teat cup. In this case, the teat cups may be individually detached from the teats of an animal when a milking process of a teat has been completed.

Preferably, the arrangement is arranged in the milking stalls of milking parlours. Especially in milking stalls with a large number of milking stalls, it is difficult to observe if a milking member is unintentionally detached during a milking process in one of the milking stalls. The milking parlour may be of the kind having a pit in the vicinity of the milking stall from which operators attach the milking members to the animals in the milking stalls. The arrangement may also be arranged in the milking stalls of a rotary milking parlour. Even in the case that a milking robot attaches the milking members to the animals in the milking stalls, there are usually operators or other persons in the vicinity of the milking parlour, which have the possibility to reattach an unintentionally detached milking member.

The above mentioned object is also achieved by the method defined in claim 14.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
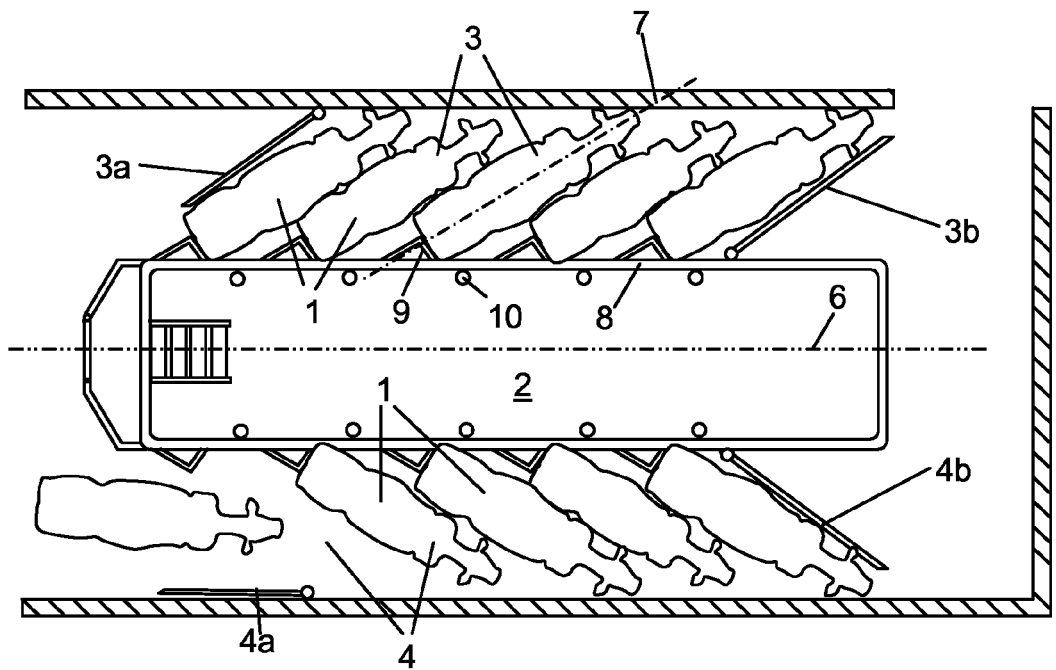
FIG. 1 shows a herringbone milking parlour provided with an arrangement according to a first embodiment of the invention.

FIG. 1 shows a milking parlour for the milking of cows 1. The milking parlour comprises a pit 2 in which at least one operator works. The pit 2 has an elongated extension. A first group of milking stalls 3 is located on a first side of the pit 2 and a second group of milking stalls 4 is located on a second side of the pit 2. In this case, each group comprises five milking stalls 3, 4. A first entrance gate 3a to the first group of milking stalls 3 is pivotally arranged between an open position and a closed position. The first entrance gate 3a defines an inclined side wall of the first group of milking stalls 3 in a closed state. A first exit gate 3b is pivotally arranged between an open position and a closed position. The first exit gate 3b defines an inclined side wall of the first group of milking stalls 3 in a closed state. In a corresponding manner, a second entrance gate 4a and a second exit gate 4b are pivotally arranged between an open position and a closed position on the opposite side of the pit 2. The cows 1 are arranged in the milking stalls 3, 4 in a herringbone pattern. When the cows are standing in the milking stalls 3, 4, a longitudinal axis 7 through the cows forms an angle to a vertical plane 6 extending in a longitudinal direction of the pit 2. However, it is also possible to arrange the milking stall in relation to the pit 2 such the longitudinal axis 7 through the cows 1 are parallel or perpendicular to said vertical plane 6. A fence arrangement 8 is arranged around the pit 2. The fence arrangement 8 prevents the cows 1 from stepping down in the pit 2.

The milking stalls 3, 4 comprise rear positioning elements in the form of rump rails 9 adapted to define the position of the rear portion of the cows 1 in the milking stalls 3, 4. Each rump rail 9 has a contact surface which is substantially perpendicular to the longitudinal axis 7 of a cow 1 standing in the milking stall 3. Each milking stall 3, 4 may comprise front positioning elements (not visible in the drawings) adapted to define the position of the front portion of the cows 1 in the milking stalls 3, 4. Such front positioning elements may be feeding troughs which moves the cows 1 to a position such that the rear portions of the cows 1 come in contact with the rump rails 9. With such a positioning of a cow 1 in a milking stall 3, 4, it is easy for an operator in the pit 2 to reach the udder of the cow 1 and attach a milking member 12 to the cow 1. Each milking stall 3, 4 comprises a removing cylinder 10 adapted to detach the milking member 12 from the cows when a milking process has been completed in the milking stalls 3, 4.

Figure 2:
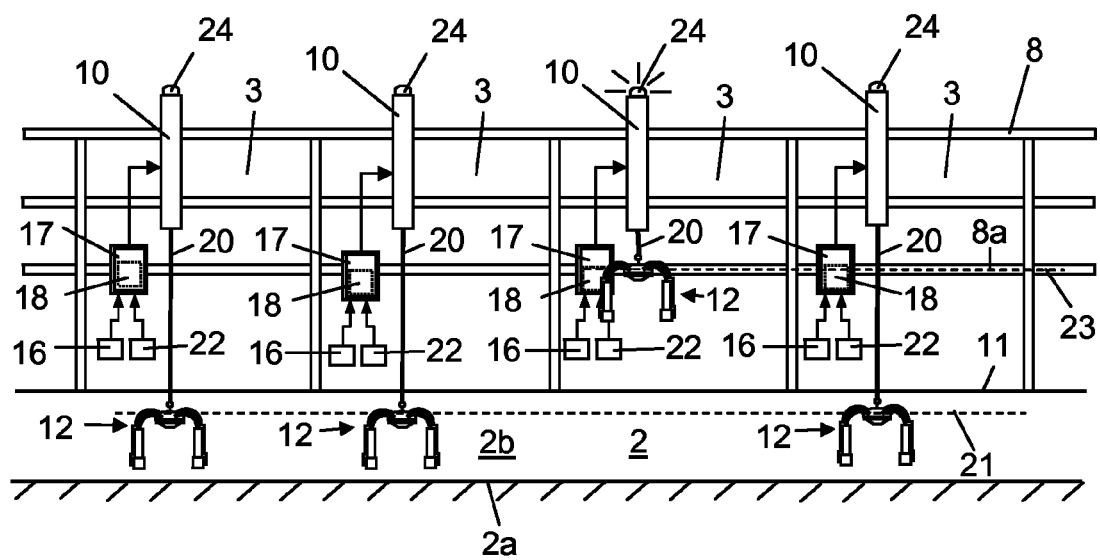
FIG. 2 shows a side view of four milking stalls in FIG. 1.

FIG. 2 shows a side view of four milking stalls 3 located on the first side of the pit 2. The milking stalls 3 comprise a floor surface 11 for the cows 1 to stand on during the milking processes in the milking stalls 3. The pit 2 comprises a floor surface 2a for operators to stand on during the work in the milking parlour. The floor surface 2a of the pit 2 is located at a lower level than the floor surface 11 of the milking stalls 3. The pit 2 comprises a substantially vertical wall surface 2b connecting the floor surface 2a of the pit 2 and the floor surface 11 of the milking stalls 3. The fence arrangement 8 is arranged on the floor surface 11 of the milking stalls 3 at the vicinity of the vertical wall surface 2b of the pit 2. Each milking stall 3 comprises a milking member in the form of a cluster 12. The cluster 12 comprises, in a known manner, a claw and four teat cups. The teat cups are connected to the claw by means of four short milk tubes and four short pulse tubes. A lower horizontal part of the fence arrangement 8a and the floor surface 11 of the milking stalls 3 define a space forming an opening to the milking stalls 3 used by the operators when they, for example, attach the clusters 12 to the cows 1 in the milking stalls 3.

Each milking stall 3 comprises a schematically disclosed milk meter 16. The milk meter 16 is adapted to measure the milk flow from a cow 1 when it is milked in the milking stall 3. Each milking stall 3 is equipped with a milking point controller 17. The milking point controller 17 in this case comprises an electric control unit 18. The removing cylinder 10 is provided with a not visible movable piston connected to the cluster 12 by means of an elongated flexible element 20 such as a wire, chain or the like. The control unit 18 is adapted to receive information from the milk meter 16 about the milk flow during a milking process of a cow 1 in the milking stall 3. When the milk flow drops below a predetermined minimum flow level during the main milking phase of a cow 1, this indicates that the cow has been completely milked. The control unit 18 activates the removing cylinder 10 which moves the piston in a direction such that the elongated flexible element 20 removes the cluster 12 from the teats of the cow 1. Thereafter, the removing cylinder 10 moves the cluster 12 to a parking position. The parking position is located at a predetermined vertical level 21 above the floor surface 2a in the pit 2. The predetermined vertical level 21 is in this case located below the floor surface 11 of the milking stall 3.

However, there is always a risk that a cluster 12 will be unintentionally detached from a cow 1 during the milking process. The cluster 12 may, for example, be kicked off by the cow 1 before a milking process has been completed. In order to determine if a cluster 12 has been detached from a cow 1 in an undesired manner, the control unit 18 is adapted to receive information from a sensor sensing a parameter which indicates if the cluster 12 has been detached before a milking process has been completed. Such a parameter may be the milk flow. As mentioned above, the control 18 unit already receives information from the milk meter 16 about the milk flow during a milking process. During a milking process, the milk flow varies in a substantially continuous manner with time. In the case that the milk flow is abruptly ceased from a level above the predetermined minimum flow level, this indicates that the cluster 12 has been detached from the cow 1 in an undesired manner. Alternatively or in combination, the control unit 18 may with information from the milk meter 16 calculate the total amount of milk which has been produced during a milking process, In the case that the amount of milk is lower than a predetermined minimum value, this is also an indication that the cluster 12 has been detached from the cow 1 before the milking process has been completed. According to a further alternative, the control unit 18 receives information from a sensor in the form of a timer 22 measuring the time period of the milking process. In the case that the measured time period of a milking process is shorter than a predetermined minimum time value, this indicates that that the cluster 12 has been detached from the cow 1 in an undesired manner. The predetermined minimum values may be the same for all cows 1. Alternatively, the predetermined minimum values may vary for different cows. Predetermined minimum values for individual cows may be based on data from earlier milking processes of the cows 1.

In the case that the control unit 18 receives information which indicates that the cluster 12 has been detached from a cow before a milking process has been completed, the removing cylinder 10 is activated such that it moves the cluster 12 to an indicating position. The indicating position is located at a clear distance from the parking position. In this case, the indicating position is located at a vertical level 23 above the floor surface 11 of the milking stall 3 and considerably above the parking position which in this case is located at a vertical level 21 below the floor surface 11 of the milking stall 3. It is now very evident for an operator in the pit 2 that this cluster 12 has been detached from a cow 1 in an undesired manner. Instead of being located at a vertical level 23 which differs from the vertical level 21 of the parking position, the indicating position could of course differ in other ways from the parking position, as long as the difference can be clearly seen by the operator.

In order to further draw the attention to the fact that this cluster 12 has been detached in an undesired manner, an indicating lamp 24 may be activated. The indicating lamp may emit a flashing light. Such an indicating lamp 24 may be placed in a suitable place in or on the vicinity of the milking stall 3. In this case, indicating lamps 24 are arranged on the top of the removing cylinders 10 of the respective milking stalls 3. Alternatively or in combination, an audible alarm may be used in the respective milking stalls 3. When an operator has noticed that a cluster 12 has been detached from a cow 1 in an undesired manner, the operator has the possibility to reattach the cluster 12 to the cow 1 such that the milking process of the cow will be completed.

If the cluster is not reattached within a predetermined time period, the control unit 18 activates the removing cylinder 10 such that it moves the cluster 12 from the indicating position to the parking position. Instead of a time period, the control unit 18 may activate the removing cylinder 10 based on an event taking place, such as the exit gate being opened and the cows being released.

Figure 3:
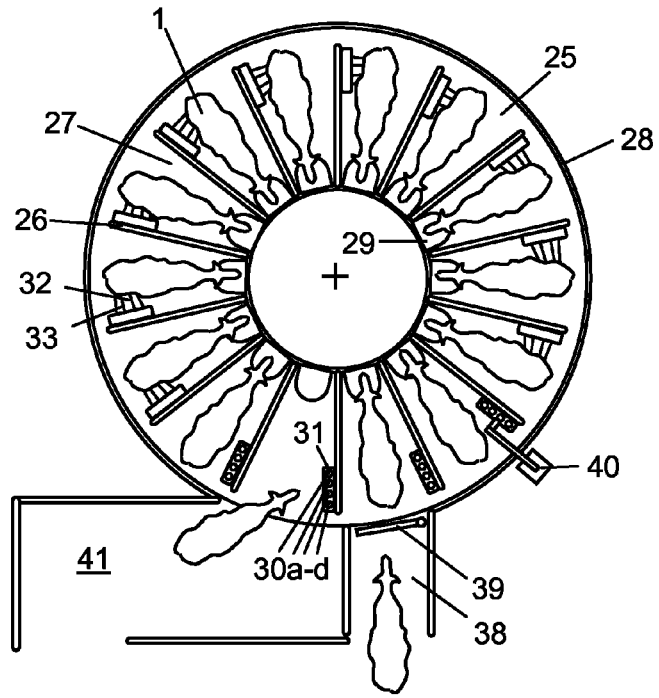
FIG. 3 shows a rotary milking parlour provided with an arrangement according to a second embodiment of the invention and FIG. 4 shows the storing device in FIG. 3 more in detail.

FIG. 3 shows a rotary milking parlour for the milking of cows 1. The milking parlour comprises a rotary annular platform 25. The platform 25 rotates during operation around a vertical centre axis. The platform 25 has an upper surface forming a support surface for the cows 1. A plurality of fence arrangements 26 are arranged on the upper surface of the platform 25. The fence arrangements form milking stalls 27 receiving individual cows 1 in predetermined milking positions. In this case, the fence arrangements 26 have an essentially straight radial extension on the platform 25 between an inner end located at the vicinity of the inner edge portion of the platform and an outer end located at the vicinity of the outer edge portion of the platform. The fence arrangements 26 are arranged at equal intervals around the annular platform 25. An outer fence arrangement 28 is mounted around a main part of the outer periphery of the platform 25. The object of the outer fence arrangement 28 is to prevent that the cows 1 in the milking stalls 27 step backward and out of the platform 25 during a milking process. Each milking stall 27 may be provided with a feeding trough 29 arranged in the vicinity of the inner periphery of the platform. Each milking stall 27 is also provided with milking members to be attached to the teats of a cow in the respective milking stall 27. In this case, the milking members comprise four separate teat cups 30a-d. Each milking stall 27 comprises a storing device 31 adapted to hold the teat cups 30a-d in a parked position when they are not used.

Figure 4:
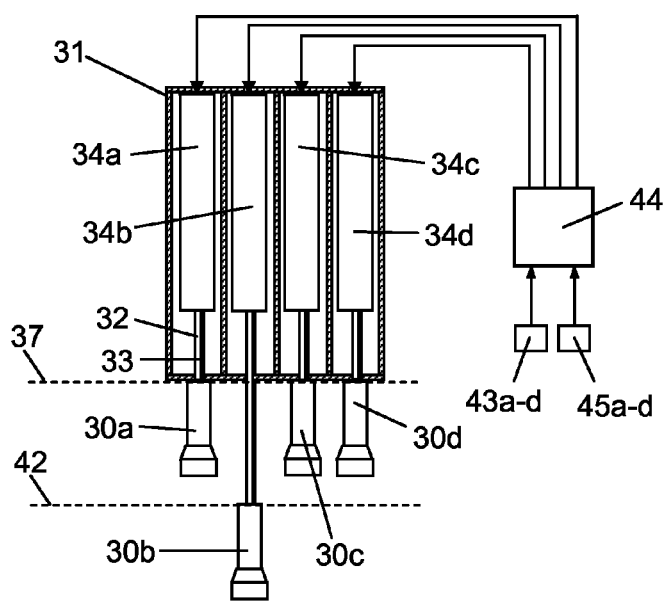

FIG. 4 shows the storing device 31 more in detail. The storing device 31 has a cabinet like construction. The storing device 31 has a design with specific parking positions for each of the four teat cups 30a-d. The parking positions are located in a row at a lower end portion of the storing device 31. Each teat cup 30a-d is provided with a milk conduit 32 and a pulsation conduit 33. The storing device 31 comprises through holes for the milk conduits 32 and the pulsation conduits 33 in the respective parking positions. A removing device 34a-d for each teat cup 30a-d is arranged in the cabinet like construction of the storing device 31. The removing devices 34a-d may be removing cylinders or actuators of an arbitrary kind such as rotary motors. Each removing device 34a-d is adapted to provide a pulling force in a milk conduit 32 and/or a pulsation conduit 33 in order to detach a teat cup 30a-d from a teat of a cow 1 when a milking process of the teat has been completed. As a result, the teat cups 30a-d are individually detached from the teats of the cow 1 and retracted to the parking position in the storing device 31. The parking positions of the teat cups 30a-d are located at a vertical level 37 above the floor surface in the milking stalls 25.

A cow 1 to be milked in the rotary parlour walks to an entrance passage 38 leading to the rotary platform 25. A gate 39 is arranged in a front position of the entrance passage 38. The gate 39 is opened when a vacant milking stall 25 arrives to a rotational position just in front of entrance passage 38 and the cow 1 enters the platform 25. Thereafter, a milking robot 40 fetches the teat cups 30 from the storing device 31 in the milking stall 25 and attaches them to the cow 1. Four schematically disclosed milk meters 43a-d are adapted to measure the milk flow received from the respective teat cups 30a-d. As soon as the milk flow from a teat drops below a predetermined minimum value, a control unit 44 activates the corresponding removing device 34a-d which removes the corresponding teat cup 30a-d from the teat. The removing device 34a-d moves the teat cup 30a-d to its parking position located at the vertical level 37. When all teat cups 30a-d have been detached and the milking process has been completed, the cow 1 leaves the milking stall 27 and enters an exit area 41.

There is a risk that one or several teat cups 30a-d will be detached from a cow 1 before a milking process of a teat has been completed. In order to determine if a teat cup 30a-d has been detached from a cow 1 in an undesired manner, the control unit 44 is adapted to receive information from a sensor measuring a parameter indicating if any one of the teat cups 30a-d has been detached from a teat before a milking process of a teat has been completed. In this case, the control unit 44 receives information from the four milk meters 43a-d. Each milk meter 43a-d measures the milk flow received from a respective teat cup 30a-d. If the milk flow from a teat cup 30a-d is abruptly ceased from a milk flow above the minimum value, this indicates that the teat cup 30a-d has been detached in an undesired manner. Alternatively or in combination, the control unit 44 may calculate the total amount of milk which has been produced from a teat during a milking process with information about the milk flow from the milk meter 43a-d. In case the amount of milk is lower than a predetermined minimum value, this indicates that the milking process of this teat has not been completed. According to a further alternative, the control unit 44 receives information from four timers 45a-d measuring the time period of the milking process of the respective teats. In case the measured time period is shorter than a predetermined minimum value, this indicates that the milking process of said teat has not been completed before said teat cup 30a-d was detached from the teat.

FIG. 4 shows the case when the control unit 44 has received information indicating that a teat cup 30b has been detached from a cow 1 before a milking process of the teat has been completed. In this case, the removing device 34b has been activated by the control unit 44 such that it has moved the teat cup 30b to an indicating position located at a lower vertical level 42 than the vertical level 37 of the parking position. When the cup 30b is in the indicating position, it is now very evident for an operator or any other person in the vicinity of the milking parlour that this teat cup 30b has been detached from a teat in an undesired manner. The operator now has the possibility to reattach the teat cup 30b to the teat of the cow 1 such that the milking process of the teat will be completed. Instead of being located at a lower vertical level 42 than the vertical level 37 of the parking position, the indicating position could of course differ in other ways from the parking position, as long as the difference can be clearly seen by the operator.

If the teat cup is not reattached within a predetermined time period, the control unit 44 activates the removing device 34b such that it moves the teat cup 30b from the indicating position at the vertical level 42 up to the parking position at the vertical level 37. Instead of a time period, the control unit 44 can activate the removing device 34b based on an event taking place, such as the rotation of the platform bringing the stall to a certain position in proximity to the exit.

The invention is not limited to the described embodiments but may be varied and modified freely within the scope of the claims. It may for example be used in any type of milking parlour, including parallel parlours and rotary herringbone parlours. In rotary milking parlours where milking clusters are attached manually by operators to the cows in the milking stalls, service arms are often used to take off the teat cups. An embodiment of the invention in such a parlour could for example be for the indicating position to be reached by the service arm holding the cluster at a horizontal position extending from the platform (as opposed to the retracted position at the parking position), which would be clearly seen by an operator.

The invention claimed is:

1. An arrangement for indicating an undesired detachment of a milking member (12, 30a-d) from an animal (1), comprising:
    the milking member (12, 30a-d) that attaches to the animal (1) for milking the animal during a milking process;
    a supervision device (17, 18, 44) that automatically supervises the milking member (12, 30a-d) during the milking process, including automatically determining i) when the milking process has been completed, and ii) when the milking member has been undesirably detached from the animal before the milking process has been completed, an undesirably detached milking member (12, 30a-d) being the milking member determined to have been detached from the animal before the milking process has been completed; and
    a removing device (10, 34a-d) that i) detaches the milking member (12, 30a-d) from the animal and moves the detached milking member to a parking position when the milking process has been determined to have been completed, and ii) moves the undesirably detached milking member (12, 30a-d) to an indicating position (23, 42) when the milking member has been determined to have detached from the animal before the milking process has been completed, the removing device (10, 34a-d) being connected to the milking member and to the supervision device,
    wherein the indicating position is located at a distance from the parking position (21, 37), the indicating position being a position visually indicating to an operator that the milking member located at the indicating position has been detached from the animal before the milking process was completed.

2. The arrangement according to claim 1, wherein,
    the parking position is located at a first vertical level (21, 37),
    the indicating position is located at a second vertical level (23, 42), and
    the second vertical level is vertically spaced apart from the first vertical level.

3. The arrangement according to claim 2, wherein,
    the second vertical level (23) of the indicting position is vertically spaced above the first vertical level of the parking position (21).

4. The arrangement according to claim 2, wherein
    the second vertical level (42) of the indicting position is vertically spaced below the first vertical level (37) of the parking position.

5. The arrangement according to claim 2, further comprising:
a sensor (16, 22) that measures a parameter indicating when the milking member has been detached from the animal before the milking process has been completed, wherein the supervision device is operatively connected to the sensor, the supervision device determining when the milking member has been detached from the animal before the milking process has been completed based on the measured parameter received from the sensor.

6. The arrangement according to claim 5, wherein the sensor is one of the group consisting of a milk meter and a timer.

7. The arrangement according to claim 6, wherein the sensor comprises the milk meter (16), the milk meter indicating when the milking member has been detached from the animal before the milking process has been completed by measuring a milk flow level during the milking process, the milk flow level abruptly changing from a value above a predetermined minimum value to a zero value indicating that the milking member has been detached from the animal before the milking process has been completed.

8. The arrangement according to claim 6, wherein the sensor comprises the milk meter (16), the milk meter indicating when the milking member has been detached from the animal before the milking process has been completed by measuring an amount of milk produced during the milking process, an amount of milk flow level measured being lower than a predetermined minimum value indicating that the milking member has been detached from the animal before the milking process has been completed.

9. The arrangement according to claim 6, wherein the sensor comprises the timer, the timer indicating when the milking member has been detached from the animal before the milking process has been completed by measuring a time period of the milking process, the measured time period being shorter than a predetermined minimum value indicating that the milking member has been detached from the animal before the milking process has been completed.

10. The arrangement according to claim 6, further comprising an indicating device (24) connected to the supervision device, the indicating device being activated when the supervision device determines that the milking member has been detached from the animal before the milking process has been completed.

11. The arrangement according to claim 10, wherein the indicating device is one of a visible alarm and an audible alarm, the indicating device being activated when the milking member has been moved to the indicating position.

12. The arrangement according to claim 5, wherein, the removing device moves the milking member to the indicating position at a first time, and
the removing device moves the milking member from the indicating position to the parking position after one of i) a predetermined time period has passed from the first time and ii) a predetermined event takes place after the first time.

13. The arrangement according to claim 5, wherein, the milking member is a cluster (12) comprising a claw and plural teat cups connected to the claw, and
the removing device moves all of the teat cups to the indicating position when the milking member has been detached from the animal before the milking process has been completed.

14. The arrangement according to claim 5, wherein the milking member is a single teat cup (30a-d) among plural teat cups used during the milking process of the animal, and
the removing device moves only the single teat cup to the indicating position when the milking member has been detached from the animal before the milking process has been completed.

15. The arrangement according to claim 5, located at one milking stall among one of i) a plurality of milking stalls arranged in a vicinity of a pit, and ii) a plurality of milking stalls arranged on a rotary platform.

16. A method for indicating an undesired detachment of a milking member (12, 30a-d) from an animal in a milking stall (3, 25), the method comprising:
attaching the milking member (12, 30a-d) to the animal (1) for milking the animal during a milking process;
automatically, by operating a supervision device (17, 18, 44) including i) supervising the milking member (12, 30a-d) during the milking process, ii) determining a) when the milking process has been completed, and b) when the milking member has been undesirably detached from the animal before the milking process has been completed, an undesirably detached milking member (12, 30a-d) being the milking member determined to have been detached from the animal before the milking process has been completed; and
automatically, by operating a removing device (10, 34a-d) connected to the milking member and to the supervision device, i) detaching the milking member (12, 30a-d) from the animal and moving the detached milking member to a parking position when the milking process has been determined to have been completed, and ii) moving the undesirably detached milking member (12, 30a-d) to an indicating position (23, 42) when the milking member has been determined to have detached from the animal before the milking process has been completed,
wherein the indicating position is located at a distance from the parking position (21, 37), the indicating position being a position visually indicating to an operator that the milking member located at the indicating position has been detached from the animal before the milking process was completed.

17. The method according to claim 16, wherein, the parking position is located at a first vertical level (21, 37),
the indicating position is located at a second vertical level (23, 42), and
the second vertical level is vertically spaced apart from the first vertical level.

18. The method according to claim 16, comprising the further step of:
by operating a sensor (16, 22), measuring a parameter indicating when the milking member has been detached from the animal before the milking process has been completed,
wherein, the supervision device is operatively connected to the sensor, the supervision device determining when the milking member has been detached from the animal before the milking process has been completed based on the measured parameter received from the sensor, and
wherein the sensor is one of a milk meter and a timer.

19. The method according to claim 18, wherein the sensor comprises the milk meter (16), the milk meter indicating when the milking member has been detached from the animal before the milking process has been completed by measuring a milk flow level during the milking process, the milk flow level abruptly changing from a value above a predetermined minimum value to a zero value indicating that the milking member has been detached from the animal before the milking process has been completed.

20. The method according to claim 18, wherein the sensor comprises the milk meter (16), the milk meter indicating when the milking member has been detached from the animal before the milking process has been completed by measuring an amount of milk produced during the milking process, an amount of milk flow level measured being lower than a predetermined minimum value indicating that the milking member has been detached from the animal before the milking process has been completed.

21. The method according to claim 18, wherein the sensor comprises the timer, the timer indicating when the milking member has been detached from the animal before the milking process has been completed by measuring a time period of the milking process, the measured time period being shorter than a predetermined minimum value indicating that the milking member has been detached from the animal before the milking process has been completed.

\* \* \* \* \*